June 18, 1968 G. R. BANGE ETAL 3,388,447
METHOD FOR MAKING JOINED GLASS LINED PIPES
Original Filed Aug. 20, 1962
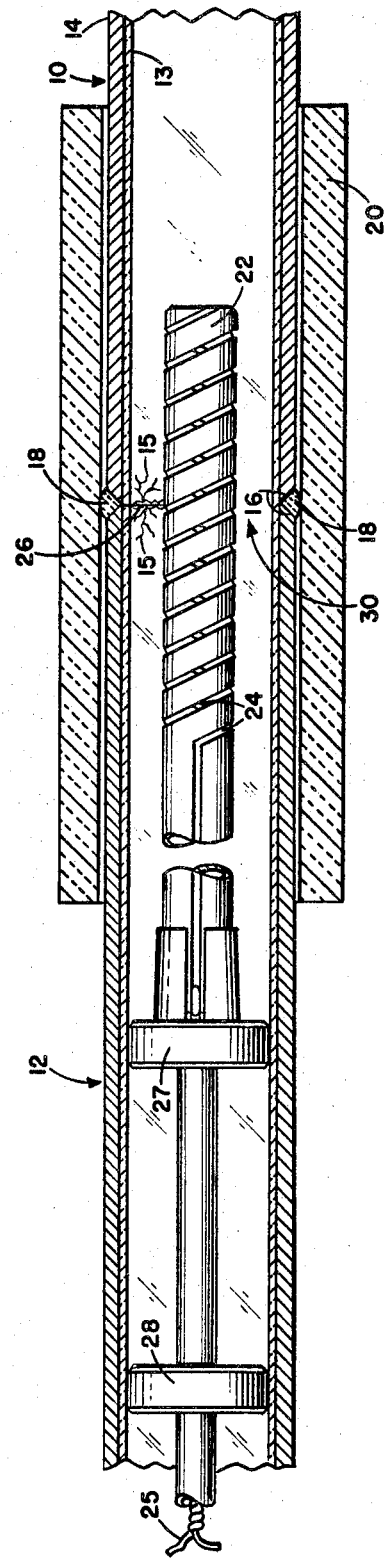
INVENTORS.
HERBERT F. YOUNG
GLENN R. BANGE
BY Thomson & Lowe
ATTORNEYS

United States Patent Office 3,388,447
Patented June 18, 1968

3,388,447
METHOD FOR MAKING JOINED
GLASS LINED PIPES
Glenn R. Bange, Pittsford, and Herbert F. Young,
Rochester, N.Y., assignor to Ritter Pfaudler Corporation, a corporation of New York
Continuation of application Ser. No. 217,915, Aug. 20, 1962. This application Nov. 25, 1966, Ser. No. 597,168
14 Claims. (Cl. 29—470)

ABSTRACT OF THE DISCLOSURE

A method of joining glass lined pipes 10 and 12 or other articles having substantially abutting surfaces formed at open ends thereof. The method is to first rigidly join the open ends of the pipes by welding 18 and thereafter fusing the entire periphery of the glass lining at the abutting surfaces by internally heating the glass lining by means of an internally received heating element 22.

---

This invention relates to joined glass lined or coated pipe or other article and method for joining glass lined or coated pipe or other article and more particularly to method for joining field cut glass lined pipe, and is a continuation of application Ser. No. 217,915 filed Aug. 20, 1962 and now abandoned.

Glass lined pipes are highly desirable in certain industries such as the chemical industry where there is a need for pipe having corrosion resistant properties. Such pipe comprises a metal outer pipe of steel interiorly lined with glass of suitable selected thickness. The composite metal pipe with glass lining fused thereto has presented the answer to many problems where highly corrosive acids and other fluids are conveyed from one piece of apparatus to another. However, use of such composite pipe has presented numerous problems. One of the greatest inconveniences was having such pipe prepared to specification at the plant where produced. Every effort has been made to overcome this disadvantage because it unduly discouraged widespread use of such pipe which otherwise presented many advantages where corrosive substances must be handled.

This disadvantage was greatly mitigated by an invention described in detail in the copending application of Herbert F. Young and Donald E. Diehl, Ser. No. 828,344 filed July 20, 1959 now issued as United States Patent No. 3,156,035, by presenting a method for healing the cracked and chipped end of a field cut pipe which after being ground down did present a smooth, gasket facing surface wider than the top of the glass lining of the pipe.

A further advancement was invented in a second copending application of Glenn R. Bange, Maynard J. Jones and Herbert F. Young, Ser. No. 124,034 filed July 14, 1961 now issued as United States Patent No. 3,246,973 which provided improved method and apparatus for healing the cracked and chipped ends of "field cut" pipe before being grounded to provide a smooth gasket facing surface for joining open ends of the pipe.

Despite the advancements made by the above mentioned inventions, as defined in the two copending applications, both of these inventions present the disadvantage of having to form a flange on the open ends of the pipe for joinder thereof, with a gasket secured intermediate the flanges.

Our invention, as described hereinafter, provides the first completely satisfactory method for joining field cut glass lined pipe and overcomes the disadvantages inherent in the above specified inventions and other known apparatus and method for joinder of open end of glass lined pipe.

One of the advantages of our invention over the prior art is the elimination of the flanges on open ends of the pipes to be joined and elimination of any necessity for a gasket intermediate the open ends of the pipes.

A further advantage of our invention is the healing of cracks and chips formed at the open ends of field cut pipe simultaneously as the open ends of glass lining are fused together to form a continuous glass lined pipe. One of the significant objects of our invention is to provide improved joined glass lined pipe and method for making the same.

It is another object of our invention to provide improved joined field cut glass lined pipe and method for making the same.

It is a further object of our invention to provide method for healing cracks, chips and the like formed at the open ends of "field cut" glass lined pipe simultaneously with the fusing thereof to form a continuous glass lined pipe.

An additional object of our invention is to provide joined glass lined pipe having a continuous glass liner extended across the joints.

Other objects and advantages of our invention will be particularly set forth in the claims and will be apparent from the following description when taken in connection with the accompanying drawing, in which:

The drawing is a sectional view of one embodiment of our invention with parts broken away.

We shall briefly describe the basic method for joining two or more lengths of glass lined pipe having substantially abutting surfaces of the same cross-sectional shape and size formed at open ends thereof. Firstly, the open ends of the metal pipes are rigidly joined in abutting relationship, as for example, by welding. Thereafter, the substantially abutting open ends of the glass liners inside of the pipes are fused together to form a continuous glass lined pipe.

With reference to the drawing, we have illustrated two lengths of composite glass lined pipes 10 and 12, each of which comprises an outer cylindrical metallic shell 14 and an inner glass lining 13 fused or bonded thereto. While our invention is adapted for use with selected length of pipe, such as 10 and 12 shipped directly from the factory, it is particularly well suited for joining "field cut" pipe, in which case selected lengths of pipe are cut directly in the "field" or at the location where the pipe is to be installed. "Field cutting" of the composite glass lined pipe produces cracks, chips, or the like at the open cut ends, such as illustrated at 15. It will be understood by those skilled in the art that the composite glass lined pipe is cut by a saw or abrasive disc adapted for use in "field cutting" of such pipe.

Because of the use of composite glass lined pipe for conducting highly corrosive chemicals and the like, it is necessary to eliminate all cracks, such as illustrated at 15.

After cutting the pipe, the open ends thereof to be joined are beveled at 16 around the entire periphery of the open abutting ends or mouths 26 of the pipes to be joined. The pipes are rigidly joined at their open beveled ends by circumferentially welding the two pipes at 18 intermediate the bevels 16.

After the outer metallic shell 14 of the pipes 10 and 12 have been rigidly joined by welding 18, preferably a split cylindrical insulator 20 is clamped into position overlying the welding 18.

An electrical high density silicon carbide heater 22 generally of tubular cross-section having a spiral groove 24 (to permit operation on 110 volts), connected across a 110-volt line by wires 25, is inserted interiorly of the pipes until the open abutting ends 26 lie substantially midway along the heating element 22.

Heating element 22 is radially spaced internally of the glass lining 13 in substantially concentric relationship by two substantially cylindrical spacers 27 and 28 having a slightly smaller outside diameter than the internal diameter of the glass lining 13.

After the split insulator 20 and heating element 22 have been properly positioned as above described, current is supplied through the wires 25 to the heater 22 until elevated temperatures ranging between 1500° F. and 2200° F. have been maintained at the area of the open abutting ends 26 sufficiently long to render the glass lining viscous. When the open abutting ends 26 of the glass lining become viscous, to fuse thereby producing a smooth, continuous glass joint, generally indicated by the numeral 30. Thus, we are able to join composite glass lined pipe in the "field" in a simplified, superior and greatly faster manner than anything heretofore known.

Glass is relatively weak in tension and relatively strong under compression. Thus, when glass lined pipe of the above nature described is heated externally to fuse the glass, the external metal pipe 14 expands away from the glass, thereby tending to break the glass under tension. Moreover, external heating of the composite pipe causes warping of the metal pipe because of the excessive heat necessary to render the glass lining viscous when heated through the metal pipe. Oxidation and scale, as well as warping, results from heating the metal to the elevated temperature necessary to heat the internal glass lining to the fusing temperature which contributes to breaking of the bond between the glass liner and the metal pipe. Therefore, preferably, our method is carried out by internally heating the glass lining as illustrated and described above.

After the glass has been fused as illustrated at 30, preferably, the heater 22 and the insulator 20 are removed to permit the cooling of the glass lining to occur from the outside in.

Preferably, the glass lining 13 is of at least ⅛ inch thickness in order to present sufficient glass at the abutting edges 26 to properly fuse and form the continuous glass lining as illustrated at 30.

While we have described our invention with reference to an internally glass lined pipe, it will be understood that this method is applicable to joinder of other glass lined articles.

While we have shown and described the preferred form of our invention, it will be apparent that various modifications and changes may be made therein and particularly in the form and the relation of the parts, without departing from the spirit of the invention as set forth in the appended claims.

We claim:

1. A method for joining glass lined metal articles having substantially abutting surfaces formed at open ends thereof, said open ends being of substantially the same cross-sectional shape and size, comprising the steps of:
    (a) Rigidly joining in continuous relationship the entire periphery of the open ends of said articles in substantially abutting relationship, and thereafter
    (b) Fusing the entire periphery of the glass lining of said articles at said abutting surfaces.

2. A method in accordance with claim 1 including a final step of cooling the joined articles from the outside in.

3. A method in accordance with claim 1 in which said fusing step comprises heating the substantially abutting glass surfaces together about the entire periphery of the glass lining.

4. A method in accordance with claim 1 in which said rigidly joining step comprises the step of welding substantially the entire periphery of the open ends of said article in substantially abutting relationship.

5. A method for joining glass lining metal pipes having substantially abutting surfaces formed at open ends thereof, said open ends being of substantially the same cross-sectional shape and size, comprising the steps of:
    (a) providing sufficient glass around the periphery of at least one of said open ends to permit the hereinafter claimed fusing step responsive to heating of said open ends to a selected fusing temperature without additional glass, thereafter,
    (b) Rigidly joining in continuous relationship the entire periphery of the open ends of said pipes in substantially abutting relationship, and thereafter
    (c) Fusing the entire periphery of the glass lining of said pipes at said abutting surfaces.

6. A method in accordance with claim 5 in which said fusing step includes internally heating the glass lining of at least one of said rigidly joined pipes at said abutting surfaces.

7. A method for joining glass lined metal pipes having substantially abutting surfaces formed at open ends thereof, said open ends being of substantially the same cross-sectional shape and size, comprising the steps of:
    (a) Rigidly joining the open ends of said pipes in continuous relationship across the entire periphery of substantially abutting ends thereof, and
    (b) Internally heating the glass lining of both of said rigidly joined pipes at said open ends until the entire periphery of the abutting surfaces of the glass linings are fused.

8. A method in accordance with claim 7 including a preliminary step of:
    (c) Providing sufficient glass around the periphery of at least one of said open ends to permit the hereinafter claimed fusing step responsive to heating of said open ends to a selected fusing temperature without additional glass and a final step of:
    (d) Cooling the joined pipe from the outside in.

9. A method in accordance with claim 7 in which said heating step comprises:
    (c) Supporting a heating element internally of said pipes in radially spaced relationship to said glass lining at said abutting surfaces, and
    (d) Actuating said heating element to heat said glass linings until the entire periphery of the glass linings at said abutting surfaces are healed.

10. A method in accordance with claim 7 in which said rigidly joining step comprises the step of welding substantially the entire periphery of the open ends of said article in substantially abutting relationship.

11. A method of joining field cut glass lined metal pipes of substantially the same cross-sectional shape and size, comprising the steps of:
    (a) Cutting said pipes to form open ends having substantially abutting surfaces,
    (b) Rigidly joining the entire periphery of the open ends of said pipes in substantially abutting relationship, and
    (c) Internally heating the glass linings of said joined pipes at said open ends until the entire periphery of said abutting surfaces of the glass linings are fused and until any cracks, chips or the like caused by field cutting are healed.

12. A method in accordance with claim 11 in which said step of rigidly joining the pipe comprises:
    (a) Externally welding substantially the entire periphery of the open ends of said pipes in abutting relationship.

13. A method for joining glass lined metal articles having substantially abutting surfaces formed at open ends thereof, said open ends being of substantially the same cross-sectional shape and size, comprising the steps of:
    (a) providing at least one of said glass lined articles with a glass lining of sufficient thickness at said open end thereof to fulfill the hereinafter claimed fusing step without additional glass; thereafter,
(b) rigidly joining the entire periphery of the open ends of said articles in substantially abutting relationship, and
(c) fusing the entire periphery of the glass lining of said articles at said abutting surfaces.

14. A method in accordance with claim 13 in which the (a) step includes cutting said article to form said open ends.

References Cited

UNITED STATES PATENTS

| | | | |
|---|---|---|---|
| 2,959,850 | 11/1960 | Deringer | 29—498 X |
| 2,959,851 | 11/1960 | Deringer | 29—498 X |
| 3,156,035 | 11/1964 | Diehl | 29—157 |
| 3,246,973 | 4/1966 | Bange | 65—28 |

CHARLIE T. MOON, *Primary Examiner.*

R. F. DROPKIN, *Assistant Examiner.*